S. R. PARKHURST.
Wool-Washing Machine.
No. 204,503. Patented June 4, 1878.
Fig. 1.
Fig. 2.
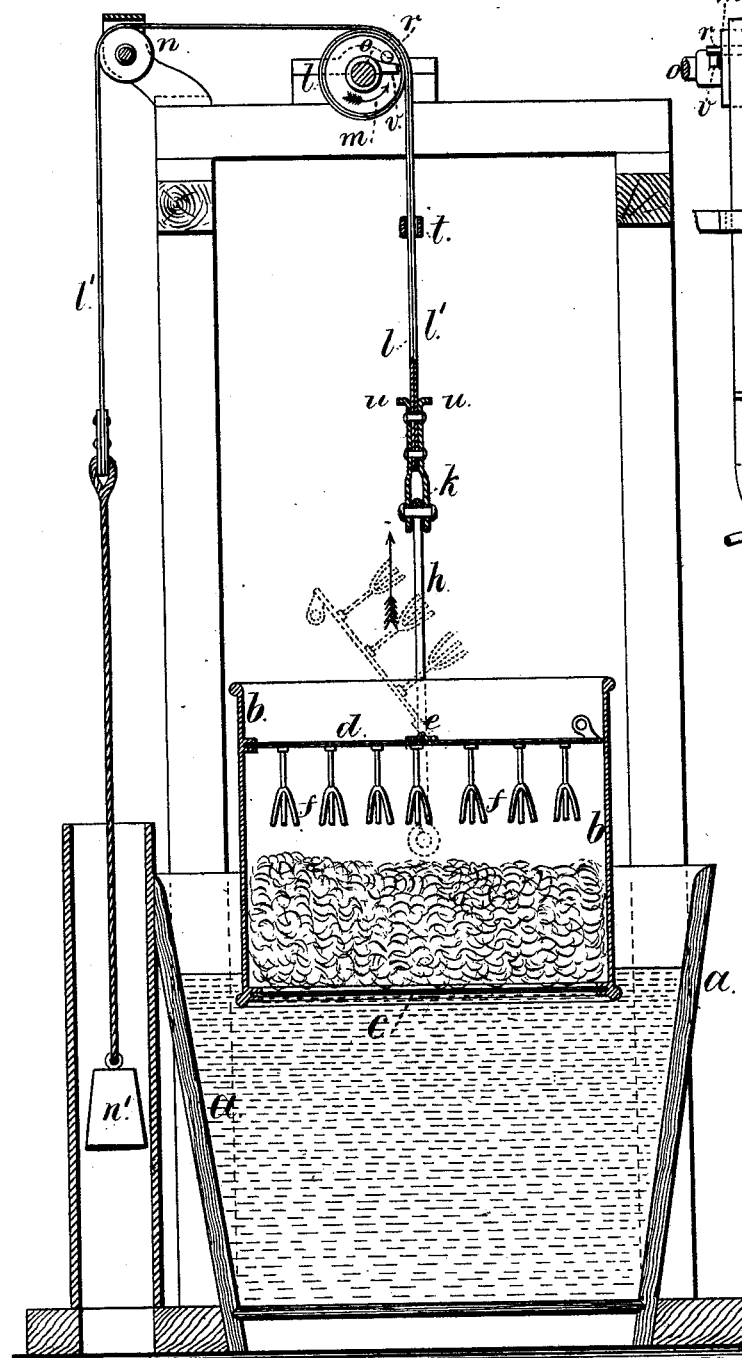
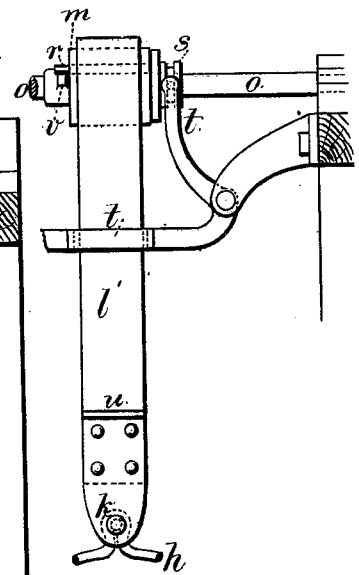
Witnesses
Chas H. Smith
Harold Serrell
Inventor
S. R. Parkhurst
per Lemuel W. Serrell att.

UNITED STATES PATENT OFFICE.

STEPHEN R. PARKHURST, OF MONT CLAIR, NEW JERSEY, ASSIGNOR TO EMILY R. PARKHURST, OF SAME PLACE.

IMPROVEMENT IN WOOL-WASHING MACHINES.

Specification forming part of Letters Patent No. 204,503, dated June 4, 1878; application filed October 1, 1877.

*To all whom it may concern:*

Be it known that I, STEPHEN R. PARKHURST, of Mont Clair, in the county of Essex and State of New Jersey, have invented an Improvement in Machinery for Washing and Dyeing Wool and other Fibers, of which the following is a specification:

This invention is for washing, dyeing, and opening wool, and is designed for the purpose of dispensing with the expensive machinery heretofore employed, and to lessen the space occupied by the washing apparatus, and to save water, and to prevent the wool becoming matted and compressed in the washing operation.

I make use of a cylinder or case open at both ends and having two open-work diaphragms, one near the bottom and the other about the middle of the cylinder. This latter has a movable section, to allow the wool to be introduced between the diaphragms. Hence, if the washer receives a vertical movement in water, the wool floats up against the upper diaphragm as the washer is immersed, and the water flows through and washes the same; and as the washer is lifted the water flows down through the wool, thus thoroughly cleansing the same by the wash in first one direction and then the other. I make use of fingers, standing down from the upper diaphragm, that serve to hold the wool and cause the current flowing past the same to open the locks of wool. By this construction I am enabled to use the washing-maching in a barrel or small vat of water, and to change the washer from one vat to the next without handling the wool itself; and I find, with some qualities of wool washed in this manner, that the animal grease that becomes absorb by the dust and dirt is separated from the same by the water and rises to the surface as the dirt subsides, and such grease may be saved and used afterward in softening the wool.

In the drawings, Figure 1 is a vertical section, representing my improvement complete; and Fig. 2 is a side view of the lifting apparatus.

The tube or vat $a$ is of any suitable size or character. A barrel or hogshead is well adapted to the purpose, and there may be a range of them standing contiguous, so that the wool may be washed in them successively, and the water may be supplied to the one in which the last washing takes place and pass from one to the other.

The washer is made of the case or cylinder $b$, with open-work or nettting diaphragms $c$ and $d$, the diaphragm $c$ being near the bottom and the diaphragm $d$ near the middle, and provided with a flap or movable section, hinged at $e$, so that it can be opened, as shown by dotted lines in Fig. 1, for the insertion or removal of the wool. There are openers formed of the fingers $f$, standing down, so that when the washer is depressed into the water of the vat such water flows upward, carrying the wool with it, and the wool is opened by being caught by the fingers before reaching the diaphraghm.

The vertical movement given to the washer may be derived from any suitable source, such as a crank and pitman; but I prefer and use the mechanism next described.

The bail $h$ is connected to the washer by pivots, so as to allow the washer to be tipped in emptying the wool. This bail is provided with a loop to connect with an eye or hook, $k$, at the lower end of the belt $l$, and this belt passes up and is attached to the pulley $m$.

There may be a second belt, $l'$, passing over the same pulley and the second roller or pulley $n$ to the partial counterpoise $n'$, that lessens the weight to be raised, and also prevents the washer falling too rapidly.

The pulley $m$ is upon the shaft $o$, but loose thereon; and there is a key, $r$, that passes through said pulley, and is attached to the coupler-hub $s$, that is also loose upon the shaft, and it is provided with a peripheral groove or rib, against which the fork of the clutch-lever $t$ operates.

The belts $l$ $l'$ pass through an eye upon this lever $t$, and there is a projection upon the belt at $u$, which, coming against the lever $t$ as the washer is drawn up, gives a movement to the hub $s$ and key $r$ endwise of the shaft $o$. Hence, if this shaft $o$ and an arm, $v$, upon the same at the side of the pulley, are continuously revolved, the said arm, taking against the key *r*, will revolve the pulley and draw up the washer until the lever *t*, hub *s*, and key *r* are moved by the belt, and the key *r* drawn back from contact with the arm *v*, which allows the washer to fall, as aforesaid.

I remark that the size of the pulley *m* is preferably sufficient to give the entire lifting motion in less than a revolution, so that the proper time for the fall of the washer is allowed for before the arm *v* comes again into contact with the key *r*.

It will be apparent that when this apparatus is in use the wool will form a layer on the bottom, through which the water is forced by gravity as the washer is lifted, and that as the washer falls that layer is opened by the fingers acting to hold portions of the fiber, while other portions are carried against the under side of the top diaphragm by the upward dash of the water as it passes into the case.

In cases where this apparatus is used in dyeing wool or other materials, the operations performed as aforesaid insure uniformity in the dyeing or coloring operation, and the fiber may be washed after dyeing in a similar apparatus.

I remark that a vat or tub is not necessary in the washing operation, as it may be done in the tail-race of a mill or other body of water.

I am aware that a washing-machine for wool has been made of two closed heads and an open-work cylinder, and that the same has been introduced in a vat and moved vertically in the water; but the heads are not perforated, and the vertical bars made use of do not open the wool, but simply prevent the contact of the same with the cylindrical open-work when the water is being thrown off by centrifugal force.

I claim as my invention—

1. The washing or dyeing apparatus made of a case with two diaphragms of netting or open-work, between which the fiber to be washed or dyed is placed, in combination with mechanism for reciprocating such apparatus in water, substantially as set forth.

2. The case *b*, diaphragms *c* and *d* of open-work, in combination with the fingers *f*, substantially as and for the purposes set forth.

3. The combination, with the washing or dyeing apparatus, consisting of a case with open-work diaphragms, of the lifting-pulley *m*, revolving shaft *o*, and coupling and uncoupling mechanism, substantially as set forth.

Signed by me this 21st day of September, A. D. 1877.

S. R. PARKHURST.

Witnesses:
GEO. T. PINCKNEY,
CHAS. H. SMITH.